United States Patent Office 3,723,130
Patented Mar. 27, 1973

3,723,130
FOOD ADDITIVE COMPOSITION OF SQUALENE, OLEYL ALCOHOL AND OLEIC AND LINOLEIC ACID
John L. Stephenson, 9004 Orange Hunt Lane, and Joseph V. Gaven, Jr., 8606 Canterbury Drive, both of Annandale, Va. 22003
No Drawing. Continuation-in-part of application Ser. No. 814,820, Apr. 9, 1969, which is a continuation-in-part of application Ser. No. 675,064, Oct. 13, 1967. This application Dec. 21, 1971, Ser. No. 210,551
Int. Cl. A23k 1/16, 1/10; A23d 5/00
U.S. Cl. 99—2 F                          20 Claims

ABSTRACT OF THE DISCLOSURE

A composition useful for significantly improving animal acceptance of feeds which consists essentially of effective amounts of squalene, oleyl alcohol, oleic acid and linoleic acid including methods of using the same. Suitable additives also include the use of squalene or oleyl alcohol or mixtures thereof alone as well as in combination with oleic and linoleic acids.

---

This is a continuation-in-part of application Ser. No. 814,820, filed Apr. 9, 1969, which is in turn a continuation-in-part of application Ser. No. 675,064, filed Oct. 13, 1967.

This invention relates to improving the acceptability of animal feeds and ingesta by the addition of chemical material to make the feeds more attractive. The invention provides a mechanism for obtaining increased or more efficient animal consumption of the ingesta to which the attractant has been added, which might well be used with, for example, cereal-based dog foods, normally unpalatable, high nutrition feeds or medicines, and rodenticides.

Flavor and odor of food products represent two of the more important elements constituting what is generally considered palatability of acceptance. In the case of household pets, such as dogs and cats, it is often desirable to increase the palatability of low-cost cereal-based foods for reasons of economy, nutrition, or both.

For slaughter animals, such as swine, beef cattle, and sheep, increasing the palatability of normal feed increases consumption and thereby decreases the feeding time between birth and achievement of marketable weight, providing operating economies to the raiser. The amount of feed consumed to achieve an increment of growth may also be significantly reduced, thereby providing savings to the raiser. The amount of feed consumed per unit of growth is spoken of as food efficiency. Increased food efficiency may or may not be accompanied by a greater rate of growth. In either case, additives in accordance with this invention may yield significantly improved food efficiency.

For high-strung animals, such as thoroughbred horses and champion pedigree dogs, situations often arise where the animal will lose interest in his normal feed to the detriment of his health. For all types of animals it may be necessary to orally administer medicines, drugs, and similar materials which may be highly unpalatable. In the case of animal pests, such as rats, the addition of an effective attractant to a poison will greatly enhance the utility of the pesticide.

Accordingly, it is an object of this invention to provide pet foods which possess a greater pet acceptance than those known heretofore.

It is an important object of this invention to increase the food efficiency in the consumption of animals raised for slaughter.

It is also an object of this invention to increase the consumption rate of animals raised for slaughter, thereby shortening the time between birth and marketing.

Still another object of this invention is to provide an improved mechanism for oral delivery of unpalatable but effective materials, such as medicines, drugs, poisons, and other substances to animals.

A more general object of this invention is to provide an additive for feed which significantly improves acceptance of the feed for consumption.

Additional objects, if not specifically set forth herein, will be readily apparent to those skilled in the art from the detailed description of the invention which follows.

We have discovered that the addition to ordinary feed of squalene or oleyl alcohol individually or in combination greatly enhances the palatability of the resulting feed. The addition of both squalene and oleyl alcohol, along with oleic acid and linoleic acid, each in significant amounts, yields not just the improvement which would come from the addition of the two independently active ingredients, but instead yields a much greater, synergistic improvement. Significant improvement in animal acceptance of foods can be obtained by adding as little as 0.2% by weight of the additive based upon the total weight of the food. The addition of larger amounts up to 1% is effective, but generally yields no overall advantage over the use of 0.2% by weight. Quite large amounts could be used, but use of such amounts generally would not be desirable for economic reasons.

The preferred additive compositions of the present invention contain squalene in combination with a significant amount of one or more of oleyl alcohol, oleic acid and linoleic acid. When used in combination with oleyl alcohol, oleic acid or linoleic acid, the squalene is preferably present in an amount of from about 10% by weight up to about 90% by weight. Each of oleyl alcohol, oleic acid, and linoleic acid may be present in an amount of from 0 to about 70% by weight. Preferably the oleyl alcohol, oleic acid and linoleic acid are each present in an amount of at least 10% by weight, particularly when it is desired to increase efficiency of food utilization.

No prior activities are known which might be considered pertinent or of direct interest with regard to the synergistic combination containing squalene and oleyl alcohol. In prior scientific, laboratory tests, squalene has been fed individually to rats, in addition to a conventional diet, both as a separate supplement and mixed with the diet. In one case, the amount of squalene fed was as low as 0.25% by weight. Similarly, in other experiments oleyl alcohol was fed as a supplement to rats, the oleyl alcohol being fed separately and not mixed with the food. These tests were for the purpose of studying the physiological effects of the additives upon parts of the body. In no sense was the acceptability of the food a factor, either express or necessarily inherent. The test animals were fed for a limited time, and then killed and studied for such factors as amount of residue in the liver.

This invention applies in particular to pet foods, rodenticides, domestic farm animal feeds, such as those for swine and beef cattle, and animal drugs and medicines. Feed for such animals includes proteins from meat, fish, and vegetable sources, carbohydrates and fiber from cereals and grains, and nutritional supplements in the form of vitamins and minerals. The additives of this invention do not adversely affect any of these ingredients and are compatible with them.

The additives of this invention are applied to the feeds most advantageously on the surface of the food particles. The additives may be added in the last step of manufacture or may be added after manufacture and prior to serving by direct mixing or aerosol spray. The additives may be encapsulated in water soluble or frangible capsules which are then incorporated into the feed. The feed would then be wetted or mixed as required to free the additive prior to feeding. Any other procedure to provide distribution of the additive throughout the feed would be within the scope of this invention.

EXAMPLE I

Two groups of dogs were fed beginning at 5 weeks of age to test this invention. The dogs were beagle puppies. They had previously been on a diet containing milk, water, and a little commercial dog meal. At the beginning of the food additive test the dogs had never been on dry food.

The dogs were housed individually in steel cages with wired floor. Water was constantly supplied. The basic ingestible materials supplied were from a commercially available, dry dog meal with contents and ingredients as follows:

Guaranteed analysis

Crude protein: not less than 23%
Crude fat: not less than 7%
Crude fiber: not more than 5%
Ash: not more than 10%
Moisture: not more than 10%

Vitamins and minerals
Not less than:

Vitamin A: 3000 USP units per lb.
Vitamin $D_2$: 1000 USP units per lb.
Niacin: 18.0 mg. per lb.
D-pantothenic acid: 4.0 mg. per lb.
Thiamine: 2.0 mg. per lb.
Riboflavin: 2.0 mg. per lb.
Pyridoxine: 2.0 mg. per lb.
Calcium (Ca): 1.0%
Phosphorus (P): 0.8%
Iron (Fe): 0.01%
Copper (Cu): 0.00066%

Ingredients

Hominy feed, soybean meal, wheat midlings, meat and bone meal, wheat red dog, animal fat preserved with BHA, iodized salt 1.0%, fish meal, zinc oxide, riboflavin supplement, U.S. Certified food color, Vitamin $B_{12}$ supplement, Vitamin A supplement, Vitamin $D_2$ supplement, Vitamin E supplement.

One group of the dogs was fed the meal to which was added, by spraying, 0.2% of a fluid additive of the following composition: squalene—30% by weight, oleyl alcohol—30% by weight, oleic acid—30% by weight, and linoleic acid—10% by weight. The contents were mixed thoroughly by shaking in a deep stainless steel pan. (Example II details tests of this combination as a feed additive for swine. The amounts used are a few percentage points different, but this small difference occurred due to circumstances of the tests, and any additive mixture in approximately the proportions of that of Example I or that of Example II would be expected to produce substantially the same results.)

The dogs were offered food in quantities well beyond their eating capacity. They were fed at 8:00 a.m. and 2:30 p.m. During the first two weeks of such feeding they were offered food for 20 minutes and during the subsequent two weeks for 25–30 minutes. New food was supplied for each feeding. The two groups were treated identically in all pertinent respects except only one group of dogs received the food with the additive.

The specific data and the results are as follows:

| Dog | Sex | Age, days | Litter | Weight at start (grams) | Food consumed (grams) | Gain (grams) | Food/gain |
|---|---|---|---|---|---|---|---|
| With additive: | | | | | | | |
| 1 | F | 56 | 1 | 2,755 | 7,462 | 2,465 | 3.03 |
| 2 | F | 66 | 3 | 2,575 | 5,491 | 1,180 | 4.65 |
| 3 | M | 60 | 2 | 2,160 | 5,031 | 1,490 | 3.38 |
| 4 | M | 66 | 3 | 3,010 | 7,669 | 2,100 | 3.65 |
| 5 | F | 66 | 3 | 2,775 | 6,608 | 1,685 | 3.92 |
| Total | | | | | 32,261 | 8,920 | 3.62 |
| Without additive: | | | | | | | |
| A | F | 56 | 1 | 2,410 | 6,483 | 2,070 | 3.13 |
| B | F | 56 | 1 | 3,455 | 6,888 | 1,525 | 4.52 |
| C | M | 60 | 2 | 2,055 | 4,918 | 1,385 | 3.55 |
| D | F | 66 | 3 | 2,560 | 5,730 | 1,290 | 4.44 |
| E | M | 77 | 4 | 2,385 | 5,166 | 1,325 | 3.90 |
| Total | | | | | 29,185 | 7,595 | 3.84 |

NOTE:

Food consumption: $\frac{32,261}{29,185}=1.1054$; 10.54% better with additive.

Weight gain: $\frac{8,920}{7,959}=1.1745$; 17.45% better with additive.

Percent food savings (food efficiency): $\frac{3.84-3.62\times100}{3.62}=6.6\%$.

EXAMPLE II

Yorkshire pigs at six weeks old were randomly selected from two litters and matched. Six pigs were from one litter and two were from the other. These were divided into one control group of three from one litter and one from the other, and one test group, consisting of the remaining animals.

The control group animals were fed a normal, balanced diet, while the test group animals were fed essentially identically except that the synergistic additive was added in the amount of 0.2% by weight of the entire feed. The conventional feed was as follows: 70% by weight Indian corn (i.e., maize) with the other major constituent being edible oil (linseed, cottonseed, etc.), with minerals and vitamins in the small amounts normally found in conventional feeds. The additive used in this test was as follows: squalene—28% by weight, oleyl alcohol—28% by weight, oleic acid—28% by weight, and linoleic acid—16% by weight. (Example I details tests of this combination as a feed additive for dogs. The amounts used are a few percentage points different, but this small difference occurred due to circumstances of the tests, and any additive mixture in approximately the proportions of that of Example I or that of Example II would be expected to produce substantially the same results.)

The additive in the amount of 0.2% by weight of the total to be fed was dissolved in one of the oil components of the diet and then dispersed into the feed. Batches of feed were made up once a week in this manner. Two pigs were placed in 8 ft. x 8 ft. pens so that four pens were in use to accommodate all pigs. The animals were given free choice feeding (i.e., the food was present at all times). They were fed for 58 days and weighed at intervals. A clear trend was established for increased weight gain in relation to the amount of feed consumed by those pigs consuming the feed with the additive. (Apparently, on the ninth or sixteenth day of the test 100 pounds of feed without the additive was introduced to the test group. This was less than 10% of the total feed and would not impair the basic validity of the results obtained.)

The specific data and the results are as follows:

| Swine | Weight 1st day of test (lbs.) | Weight 14th day of test (lbs.) | Weight 30th day of test (lbs.) | Weight 58th day of test (lbs.) | Gain 58 days (lbs.) | Average daily gain (lbs.) |
|---|---|---|---|---|---|---|
| With additive: | | | | | | |
| 1 | 66 | 90 | 119 | 159 | 93 | 1.60 |
| 2 | 51 | 76 | 111 | 175 | 124 | 2.14 |
| 3 | 42 | 66 | 99 | 147 | 105 | 1.81 |
| 4 | 37 | 56 | 83 | 139 | 102 | 1.76 |
| Total | 196 | 288 | 412 | 620 | 424 | 1.76 |
| Without additive: | | | | | | |
| A | 71 | 93 | 125 | 171 | 100 | 1.72 |
| B | 44 | 67 | 96 | 152 | 108 | 1.86 |
| C | 42 | 66 | 96 | 146 | 104 | 1.79 |
| D | 38 | 60 | 89 | 147 | 109 | 1.88 |
| Total | 195 | 286 | 406 | 616 | 421 | |

NOTE:
Total feed consumed: Group with additive—1,090 lbs.; group without additive—1,250 lbs.

Feed/gain: Group with additive—1,090/424=2.57; group without additive—1,250/421=2.97.

Weight gain: $\frac{424}{421}=1.007$; 0.7% better with additive.

Percent food savings (food efficiency): $\frac{2.97-2.57}{2.97} \times 100 = 13.5\%$ better with additive.

EXAMPLE III

A number of pigs randomly selected from three different litters of average starting weight of 40 lbs. were fed in the manner of Example II using several individual compounds as additives. The test feeding was conducted for 38 days. The conventional feed used was the same as used in Example II. A number of tests were conducted with each test group containing two pigs. One control group received no additive. Positive results were obtained as follows: oleyl alcohol individually and squalene individually increased the rate of gain 3.5% and 9.4% respectively and also increased the food savings 3.1% and 6.2% respectively. The tests on those two compounds were conducted with the amount of additive at 0.2% by weight of the total feed. Individual compounds found by this experiment not to have substantial, overall effectiveness as a food additive to increase gain or food efficiency were: triolein, linoleic acid, oleic acid, and palmitic acid.

EXAMPLE IV

To show that the additive is effective over wide and varying ranges of ingredients, the following compositions were prepared.

| | Percent by volume | | | | |
|---|---|---|---|---|---|
| | 1 | 2 | 3 | 4 | 5 |
| Ingredients: | | | | | |
| Squalene | 25 | 70 | 10 | 10 | 10 |
| Oleic acid | 25 | 10 | 70 | 10 | 10 |
| Oleyl alcohol | 25 | 10 | 10 | 70 | 10 |
| Linoleic acid | 25 | 10 | 10 | 10 | 70 |

Each of compositions 1 through 5 was offered to a dog. The dog lapped each composition enthusiastically. Compositions 2 through 5 were tested with a second dog with similar results.

MISCELLANEOUS EXAMPLES AND SUMMATION

The synergistic additive generally as described in Examples I and II was added at 0.2% by weight to a cereal-based dog food that had been rejected by a dog. That induced the dog to eat the food.

The four ingredients used in the additives of Examples I and II have been tested as additives in various combinations of two's and three's. In some cases the activity is depressed, even to a level less than that of the control. In no case was a combination greatly more active than that of an individually active ingredient, except, of course, for the combination used in Examples I and II, where greatly increased activity is noted.

It should be clear that this invention has great potentialities in the field of nutrition and feeding of domestic animals. A domestic animal may be defined for these purposes as one which is normally tame and which is fed in captivity with diets calculated to improve and maintain the health and physical condition of the animal. These domestic animals include house pets, such as dogs and cats, and most animals raised for slaughter such as pigs, beef cattle, and sheep. As an example of the magnitudes involved, roughly 100 million pigs are raised for slaughter per year in the United States of America. Feeding in accordance with this invention would generally begin at weaning, when the young pigs weigh about 60 lbs. The feed would be continued for substantially the entire period until the pigs are at 200 lbs. or more. Food efficiency under present practices is about 3.0 lbs. per lb. of growth. Thus, the amount of feed involved is enormous.

Similarly, with pets such as dogs or cats, the additive ideally would be used at all times after weaning to give the animal the full advantage of the improved feeding program.

When the additive is to be stored or held for long periods in less than ideal conditions, it may be desirable to add any antioxidant which is acceptable in foods, as a preservative.

While the invention has been described in part with detailed reference to specific examples and tests, it will be clear from the entire description that modifications and variations are fully within the scope of the invention taught. Consequently, the following claims and the coverage afforded from them in accordance with law should be considered the measure of the patent protection granted.

What is claimed is:

1. A composition for improving animal acceptance of ingestible materials consisting essentially of from about 10% to about 90% by weight squalene and from about 10 to 70% of at least one compound selected from the group consisting of oleyl alcohol, oleic acid, linoleic acid, and mixtures thereof.

2. A composition for animal ingestion comprising a balanced food and an additive, the proportion of said additive being effective to increase substantially the acceptance of food by animals, said additive consisting essentially of from about 10% to about 90% by weight squalene and from 10 to about 70% by weight of each oleyl alcohol, oleic acid, and linoleic acid.

3. A composition according to claim 2 in which the additive is present as a coating on the food.

4. A composition according to claim 2 in which the additive is present in amount at least 0.2% by weight of the total weight of the composition.

5. A composition according to claim 2 in which the additive is present in an amount between about 0.2 and about 1.0% by weight of the total weight of the composition.

6. A composition for animal ingestion comprising a balanced food and an additive consisting essentially of squalene, oleyl alcohol, oleic acid and linoleic acid, the proportion of said additive being effective to increase substantially the efficiency of food utilization, said additive containing about 28% to 30% by weight of each squalene, oleyl alcohol and oleic acid and from about 10% to 16% by weight of linoleic acid.

7. A composition according to claim 6 in which the additive is present in an amount between about 0.2% and 1.0% by weight based on the total weight of the composition.

8. A method of feeding young dogs to increase their weights, which comprises feeding the dogs a balanced food containing an amount of additive which is effective to increase the acceptance of the food by the dogs, said additive consisting essentially of from about 10% to about 90% by weight squalene and from 10 to about 70% by weight of each oleyl alcohol, oleic acid and linoleic acid.

9. A method according to claim 8 in which the additive is present in an amount between about 0.2% and 1.0% by weight based upon the total weight of the food.

10. A method according to claim 9 in which the additive consists essentially of about 30% by weight each of squalene, oleyl alcohol and oleic acid and about 10% by weight of linoleic acid.

11. A method of feeding young dogs to increase their weights, which comprises feeding the dogs a balanced food containing an amount of additive which is effective to increase the acceptance of the food by the dogs, and to increase the weight gain per pound of food, said additive consisting essentially of from 28% to 30% by weight of each squalene, oleyl alcohol and oleic acid, and from 10% to 16% by weight of linoleic acid.

12. The method according to claim 11 in which said additive is present in an amount between about 0.2% and 1.0% by weight based upon the total weight of the food.

13. A method of feeding swine to increase their weight gain per pound of food consumed comprising feeding the swine a balanced food containing an amount of an additive to improve acceptance by said swine, said additive consisting essentially of from about 10% to 90% by weight squalene, and from 10 to about 70% by weight of each oleyl alcohol, oleic acid and linoleic acid.

14. A method according to claim 13 in which the additive is present in the food in an amount at least 0.2% by weight based upon the total weight of the feed.

15. A method of feeding swine to increase their weight gain per pound of food consumed comprising feeding the swine a balanced food containing an amount of an additive to effectively increase the weight gain, said additive consisting essentially of from about 28% to 30% by weight of each squalene, oleyl alcohol and oleic acid and from about 10% to 16% by weight of linoleic acid.

16. A method according to claim 15 in which the additive is present in the feed in an amount at least about 0.2% by weight based upon the total weight of the feed.

17. A method according to claim 15 in which the additive consists essentially of about 28% by weight of each squalene, oleyl alcohol and oleic acid and about 16% by weight of linoleic acid.

18. A method for increasing the weight of domestic animals comprising the step of feeding the animals a balanced feed and an additive in an amount effective to increase the acceptance of the feed by the animals and to increase the effectiveness of the balanced feed in adding weight to the animals, said additive being selected from the group consisting of squalene and a mixture of squalene and oleyl alcohol, the amount of squalene being from about 0.1% to about 1.0% by weight based upon the total weight of the feed.

19. A method according to claim 18 wherein the additive consists essentially of squalene and is present in amounts of from about 0.2% to 1.0% by weight of the total weight of the feed.

20. A method according to claim 18 wherein the additive consists essentially of equal weights of squalene and oleyl alcohol.

References Cited

UNITED STATES PATENTS

| | | | |
|---|---|---|---|
| 3,458,625 | 7/1969 | Ensor et al. | 424—318 |
| 2,970,911 | 2/1961 | Lorz | 99—2 |
| 3,117,866 | 1/1964 | Golub et al. | 99—2 |
| 2,701,770 | 2/1955 | Kuburt | 99—163 |

OTHER REFERENCES

| | | | |
|---|---|---|---|
| 1,045,704 | 10/1966 | Great Britain | 99—2 |
| 176,059 | 4/1917 | Canada | 260—412.1 |

OTHER REFERENCES

Kritchevsky et al., Chemical Abstracts, vol. 66, 1967, p. 9724, article 104122v.

Said et al., Chemical Abstracts, vol. 64, 1966, p. 6915, column 1g.

Walbecq, Chemical Abstracts, vol. 63, 1965, pp. 7214–5.

NORMAN YUDKOFF, Primary Examiner

C. P. RIBANDO, Assistant Examiner

U.S. Cl. X.R.

99—2 R, 118, 166